(12) United States Patent
Taniguchi (10) Patent No.: US 9,106,115 B2
(45) Date of Patent: Aug. 11, 2015

(54) ROTATING ELECTRICAL MACHINE

(71) Applicant: DENSO CORPORATION, Kariya, Aichi-pref. (JP)

(72) Inventor: Makoto Taniguchi, Obu (JP)

(73) Assignee: DENSO CORPORATION, Kariya (JP)

( * ) Notice: Subject to any disclaimer, the term of this patent is extended or adjusted under 35 U.S.C. 154(b) by 298 days.

(21) Appl. No.: 13/930,055

(22) Filed: Jun. 28, 2013

(65) Prior Publication Data

US 2014/0001909 A1 Jan. 2, 2014

(30) Foreign Application Priority Data

Jun. 29, 2012 (JP) ................................ 2012-146673

(51) Int. Cl.
*H02K 1/27* (2006.01)
*H02K 21/14* (2006.01)

(52) U.S. Cl.
CPC .............. *H02K 1/2766* (2013.01); *H02K 1/274* (2013.01); *H02K 1/278* (2013.01); *H02K 21/14* (2013.01); *H02K 2213/03* (2013.01)

(58) Field of Classification Search
CPC ............................ H02K 1/2766; H02K 1/274
See application file for complete search history.

(56) References Cited

U.S. PATENT DOCUMENTS

| | | | | |
|---|---|---|---|---|
| 5,631,512 A * | 5/1997 | Kawabata et al. | ....... | 310/156.15 |
| 8,502,430 B2 * | 8/2013 | Yamada et al. | .......... | 310/156.53 |
| 2010/0148612 A1 * | 6/2010 | Takemoto et al. | ....... | 310/156.53 |
| 2011/0140562 A1 | 6/2011 | Kato et al. | | |
| 2011/0148240 A1 | 6/2011 | Koide et al. | | |
| 2011/0193440 A1 | 8/2011 | Yamada et al. | | |
| 2011/0193441 A1 | 8/2011 | Moynot et al. | | |
| 2011/0285243 A1 * | 11/2011 | Taniguchi | .............. | 310/216.074 |
| 2011/0309707 A1 * | 12/2011 | Kato et al. | ............... | 310/156.54 |
| 2012/0019089 A1 | 1/2012 | Takemoto et al. | | |

FOREIGN PATENT DOCUMENTS

| | | |
|---|---|---|
| JP | 2011-083119 | 4/2011 |
| JP | 2012-5252 | 1/2012 |
| JP | 2012-005252 | 1/2012 |
| JP | 2012-029405 | 2/2012 |

OTHER PUBLICATIONS

Office Action (2 pages) dated May 1, 2014, issued in corresponding Japanese Application No. 2012-146673 and English translation (2 pages).
Publication Submission Statement (3 pgs.) dated Jul. 3, 2014 submitted in Japanese Application No. 2012-146673 with an at least partial English-language translation thereof (2 pgs.).

* cited by examiner

*Primary Examiner* — Dang Le
(74) *Attorney, Agent, or Firm* — Nixon & Vanderhye PC (57) ABSTRACT

A rotating electrical machine includes a stator core, a rotor core, and permanent magnets. The stator core includes a yoke and tooth portions projecting from the yoke in a radial inward direction. Each tooth portion has a base joined to the yoke and an end opposite to the base. The rotor core includes a boss portion and projections. The projections project from the boss portion in a radial outward direction and spaced in a circumferential direction. Each permanent magnet is located between and spaced from adjacent projections to form a gap in the circumferential direction. A width of the gap is not greater than a width of the end of the tooth portion in the circumferential direction.

8 Claims, 13 Drawing Sheets

ROTATING ELECTRICAL MACHINE

CROSS REFERENCE TO RELATED APPLICATION

This application is based on Japanese Patent Application No. 2012-146673 filed on Jun. 29, 2012, the disclosure of which is incorporated herein by reference.

FIELD

The present disclosure relates to a rotating electrical machine.

BACKGROUND

Permanent magnet materials such as rare-earth magnets have high energy density and therefore are essential materials to reduce the size of an electrical machine. However, it is hard to obtain an adequate amount of permanent magnet materials due to uneven distribution of resources in the world. For this reason, machines have been designed to reduce use of permanent magnet materials as much as possible. For example, in a rotating electrical machine disclosed in JP-A-2011-250508 corresponding to US 2011/0285243, a consequent-pole rotor is employed to reduce use of permanent magnet materials. The consequent-pole rotor has projections, projecting radially outward from a boss portion, and permanent magnets located between adjacent projections.

SUMMARY

After deep analysis of the rotating electrical machine disclosed in US 2011/0285243, the present inventor finds out that if a rotating electrical machine is designed by employing magnetic circuit data disclosed in US 2011/0285243, a variation in rotation of a rotor may occur. In particular, when the rotating electrical machine is used in an electrical power steering system of a vehicle, cogging torque may be increased. In a technique disclosed in US 2011/0285243, the magnetic circuit data is specialized for output torque. Specifically, the width of the permanent magnet is much greater than the width of the projection. This causes a disturbance in the space magnetic field distribution, and the disturbance results in the increase in the cogging torque. In summary, the present inventor finds out that the increase in the cogging torque is closely related to an interaction among the permanent magnet, the projection, and a tooth portion of a stator.

In view of the above, it is an object of the present disclosure to provide a rotating electrical machine for reducing cogging torque without a reduction in output torque.

According to an aspect of the present disclosure, a rotating electrical machine includes a supporting member, a stator core, a winding, a rotation shaft, a rotor core, and permanent magnets. The stator core includes a ring-shaped yoke fixed to the supporting member and tooth portions projecting from the yoke in a radial inward direction. Each tooth portion has a base joined to the yoke and an end opposite to the base. The winding is wound in a slot between the tooth portions. The rotation shaft extends through the stator core and rotatably supported by the supporting member. The rotor core includes a boss portion and projections. The boss portion is fixed to the rotation shaft. The projections project from the boss portion in a radial outward direction and spaced from each other in a circumferential direction. The permanent magnets are fixed to the boss portion. Each permanent magnet is located between and spaced from adjacent projections to form a gap in the circumferential direction. A width of the gap in the circumferential direction is equal to or smaller than a width of the end of the tooth portion in the circumferential direction.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Firstly, a cause of an increase in cogging torque found out by the present inventor is described below with reference to FIGS. 12, 13, and 14.

Figure 12:
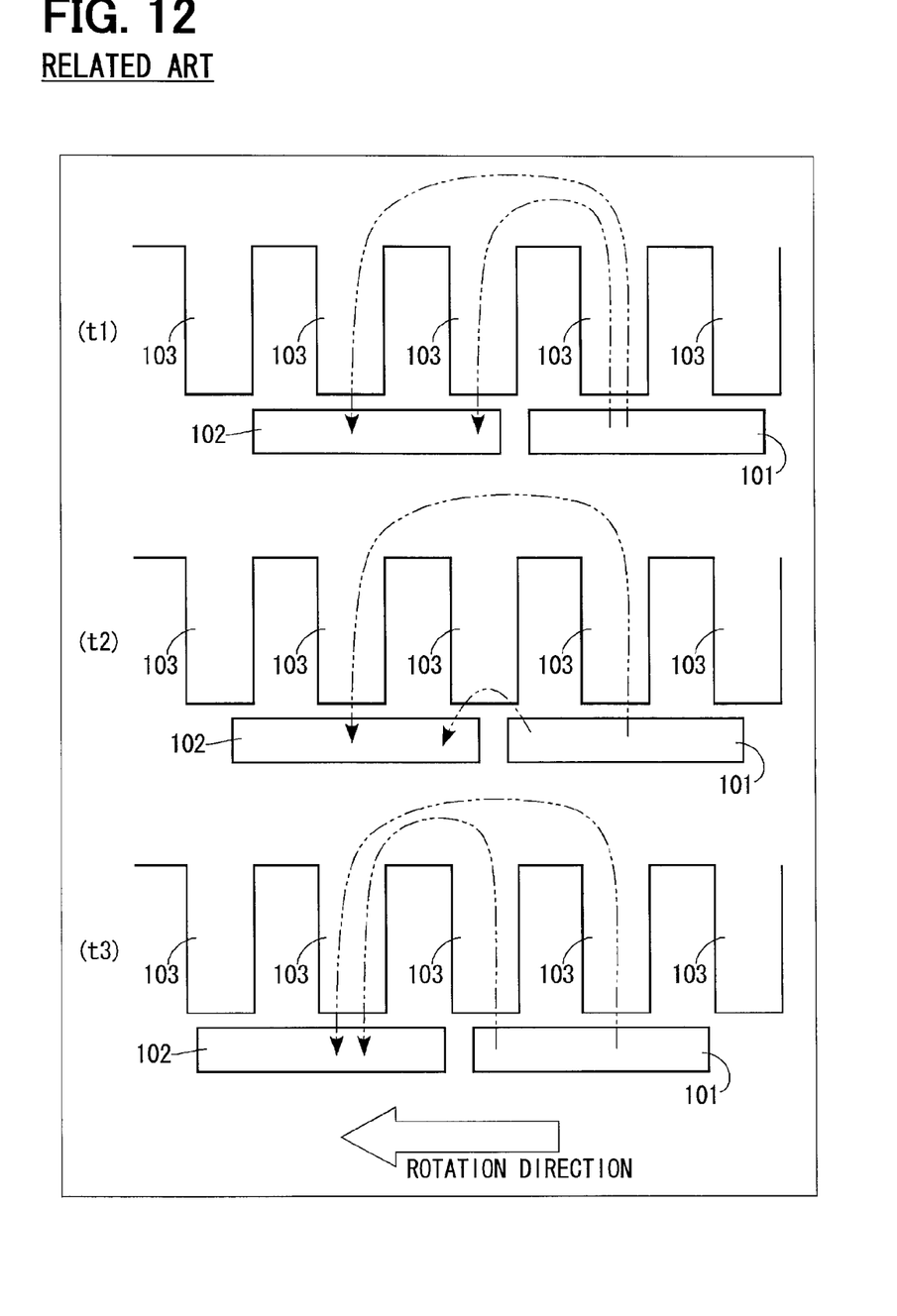
FIG. 12 is a diagram illustrating a change in magnetic flux over time in the motor according to the first comparison example.

FIG. 12 shows a change in magnetic flux over time t1 to t3 in a first comparison example in which a gap between a permanent magnet 101 and a projection 102 of a rotor in a circumferential direction is small. FIG. 13 shows a change in magnetic flux over time t1 to t3 in a second comparison example in which a gap between a permanent magnet 104 and a projection 105 of a rotor in a circumferential direction is large.

As shown in FIG. 12, when the gap between the permanent magnet 101 and the projection 102 of the rotor in the circumferential direction is small, an end of a tooth portion 103 of a stator in a radial inward direction magnetically bypasses between magnetic poles easily. Thus, as indicated by broken lines in FIG. 12, a certain amount of main magnetic flux always flows in the tooth portion 103 so that cogging torque observed when no current is supplied can become small. However, since lateral magnetic flux (i.e., leakage magnetic flux) is increased, a reduction in output torque observed when a rated current is supplied is large.

Therefore, it is preferable that a gap between a permanent magnet and a projection of a rotor in a circumferential direction be as large as possible. However, as shown in FIG. 13, when the gap between the permanent magnet 104 and a projection 105 of the rotor in the circumferential direction is too large, an end of a tooth portion 106 of a stator in a radial inward direction cannot adequately bypass between magnetic poles. Thus, as indicated by broken lines in FIG. 13, main magnetic flux does not always flow in the tooth portions 103. As a result, a magnetized condition varies largely depending on a rotor position so that cogging torque can become large.

Figure 13:
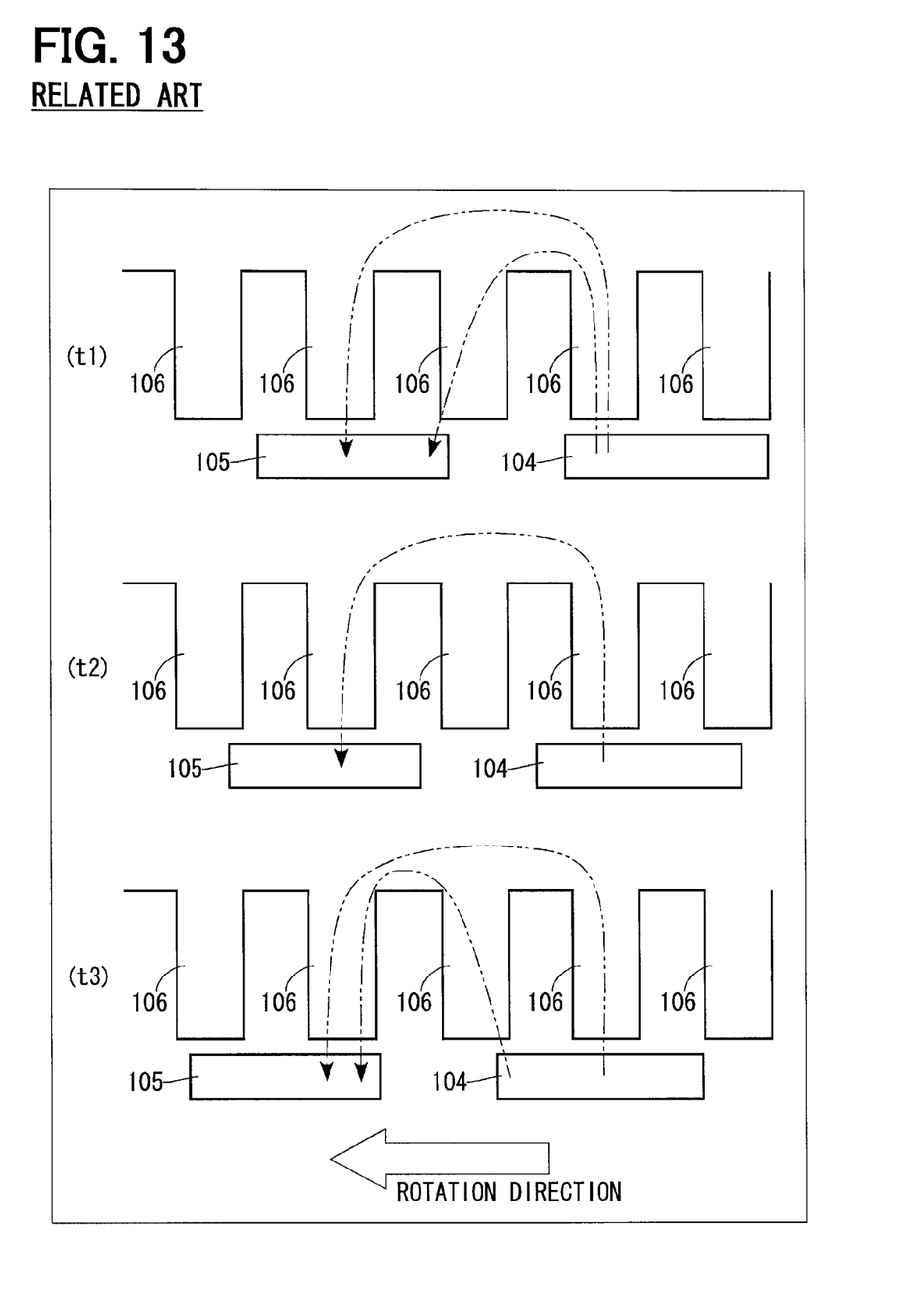
FIG. 13 is a diagram illustrating a change in magnetic flux over time in a motor according to a second comparison example.
Figure 14:
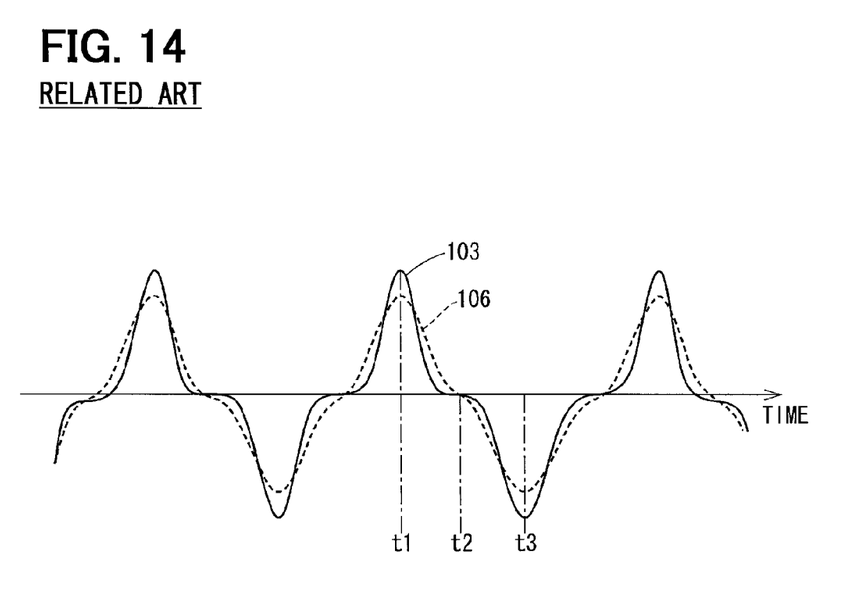
FIG. 14 is a diagram illustrating a waveform of magnetic flux in a tooth portion of each of the motors of FIGS. 12 and 13.

As indicated by a solid line in FIG. 14, a waveform of magnetic flux in the tooth portion 106 of the second comparison example shown in FIG. 13 is distorted largely and contains a lot of harmonics. Therefore, magnetic flux rotating in a stator varies so that cogging torque can become large.

On the other hand, as indicated by a broken line in FIG. 14, a waveform of magnetic flux in the tooth portion 103 of the first comparison example shown in FIG. 12 is distorted a little. However, since the crest value of the waveform is reduced, effective magnetic flux is reduced accordingly. This phenomenon appears pronouncedly when a permanent magnet is wider than a projection as disclosed in JP-A-2011-250508.

Next, embodiments of the present disclosure are described based on the above findings.

(First Embodiment)

Figure 1:
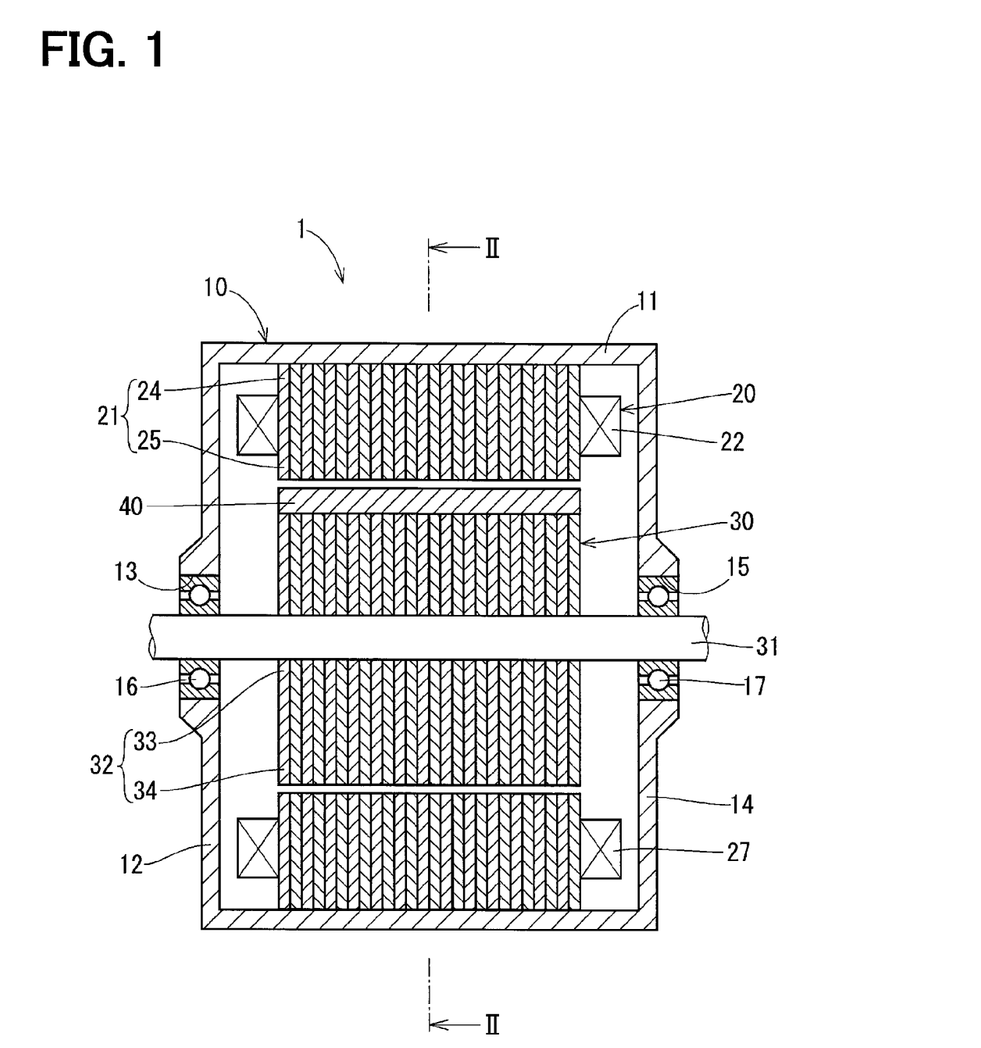
FIG. 1 is a diagram illustrating a cross-sectional view of an electrical motor according to a first embodiment of the present disclosure.
Figure 2:
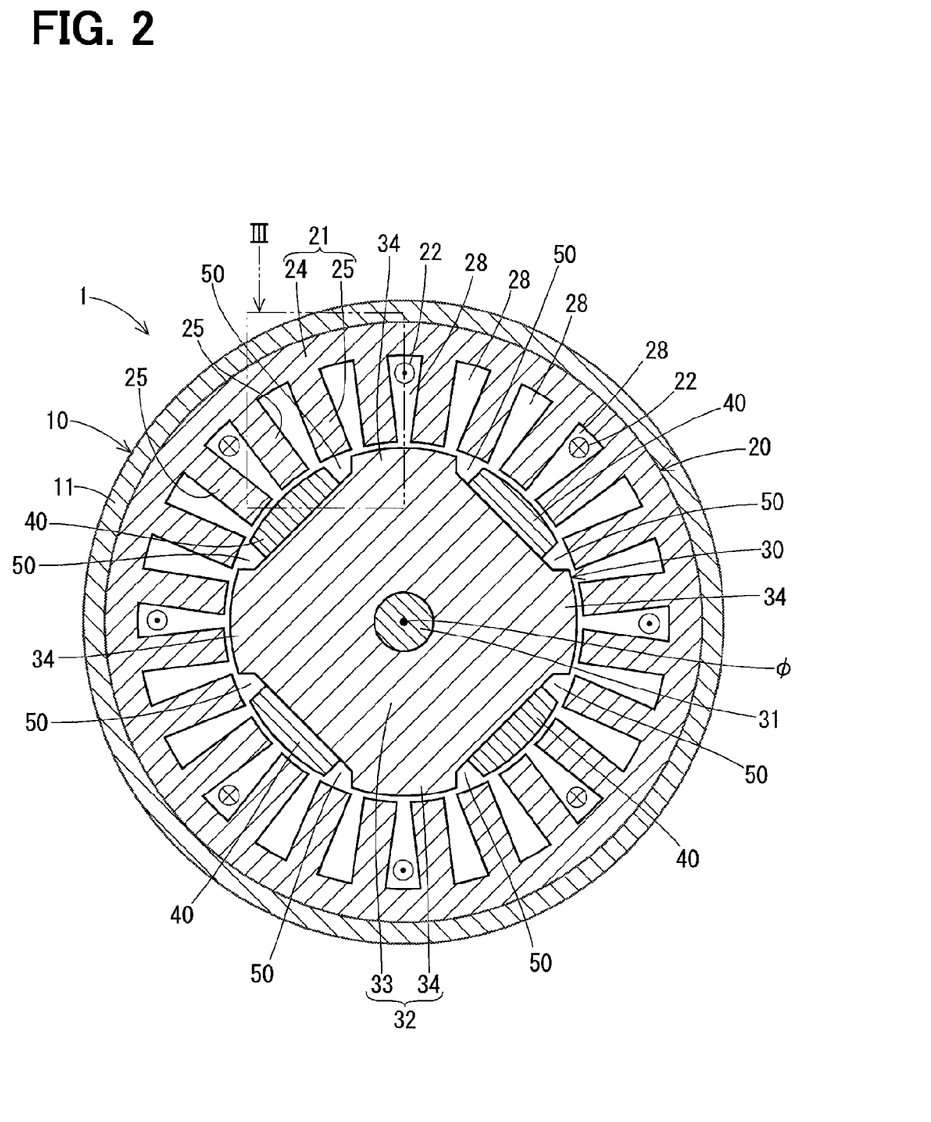
FIG. 2 is a diagram illustrating a cross-sectional view taken along line II-II in FIG. 1.

A motor 1 (as a rotating electrical machine) according to a first embodiment of the present disclosure is described below with reference to FIGS. 1 and 2. As shown in FIG. 1, the motor 1 is a three-phase brushless motor. The motor 1 includes a housing 10, a stator 20, and a rotor 30.

The housing 10 includes a tube 11, a first side portion 12, and a second side portion 14. A first end of the tube 11 is closed with the first side portion 12. A second end of the tube 11 is closed with the second side portion 14. A bearing 16 is fitted in a through hole 13 in the center of the first side portion 12. A bearing 17 is fitted in a through hole 15 in the center of the second side portion 14.

The stator 20 includes a stator core 21 and a winding set 22. The stator core 21 is located in the tube 11 of the housing 10. The winding set 22 is wound on the stator core 21.

The stator core 21 has a yoke 24 and tooth portions 25. The yoke 24 is pressed into the tube 11 so that the yoke 24 can be pressed against and fixed to an inner surface of the tube 11. The tooth portions 25 project from the yoke 24 in a radial inward direction of the yoke 24. The yoke 24 and the tooth portions 25 are formed as a single piece. According to the first embodiment, the stator core 21 has twenty-four tooth portions 25. That is, the number of the tooth portions 25 for every magnetic pole and every phase is one. The tooth portions 25 are arranged at a regular interval in a circumferential direction of the yoke 24.

The winding set 22 includes a U-phase winding, a V-phase winding, and a W-phase winding. A slot 28 is formed between adjacent tooth portions 25. Each winding of the winding set 22 is wound in every third slot 25. In other words, each winding of the winding set 22 is wound at intervals of three slots 25. It is noted that FIG. 2 shows a direction of an electric current flowing through the U-phase winding only.

The rotor 30 is a consequent-pole rotor. The rotor 30 includes a rotation shaft 31, a rotor core 32, and permanent magnets 40.

The shaft 31 is rotatably supported by the bearings 16 and 17.

The rotor core 32 is made from soft magnetic material. The rotor core 32 includes a boss portion 33 and projections 34. The boss portion 33 is fixed to the shaft 31, for example, by press-fitting the shaft 31 into the boss portion 33. The projections 34 project from the boss portion 33 in a radial outward direction of the boss portion 33 and are spaced from each other in a circumferential direction of the boss portion 33. The projections 34 serve as soft magnetic poles. According to the first embodiment, the rotor core 32 is made of steel plates that are laminated in a direction of an axis $\phi$ of the shaft 31.

The permanent magnets 40 are fixed to the boss portion 33. Each permanent magnet 40 is located between and spaced from adjacent projections 34 to form a gap 50 in the circumferential direction.

The boss portion 33 of the rotor core 32 serves as a magnetic flux conductor for conducting a magnetic flux expelled from the permanent magnet 40. The magnetic flux expelled from the permanent magnet 40 consists of a main flux and a leakage flux. The main flux flows from the permanent magnet 40 to the projection 34 through the tooth portions 25 and the yoke 24. The leakage flux flows in a lateral direction from the permanent magnet 40 to the projection 34 through the tooth portions 25 and does not flow through the yoke 24.

In the motor 1, each winding of the winding set 22 is connected to a power converter (not shown) including an inverter, a controller, and a battery and energized in turn so that a magnetic field rotating in the circumferential direction can be generated. The rotor 30 rotates according to the rotating magnetic field.

Figure 3:
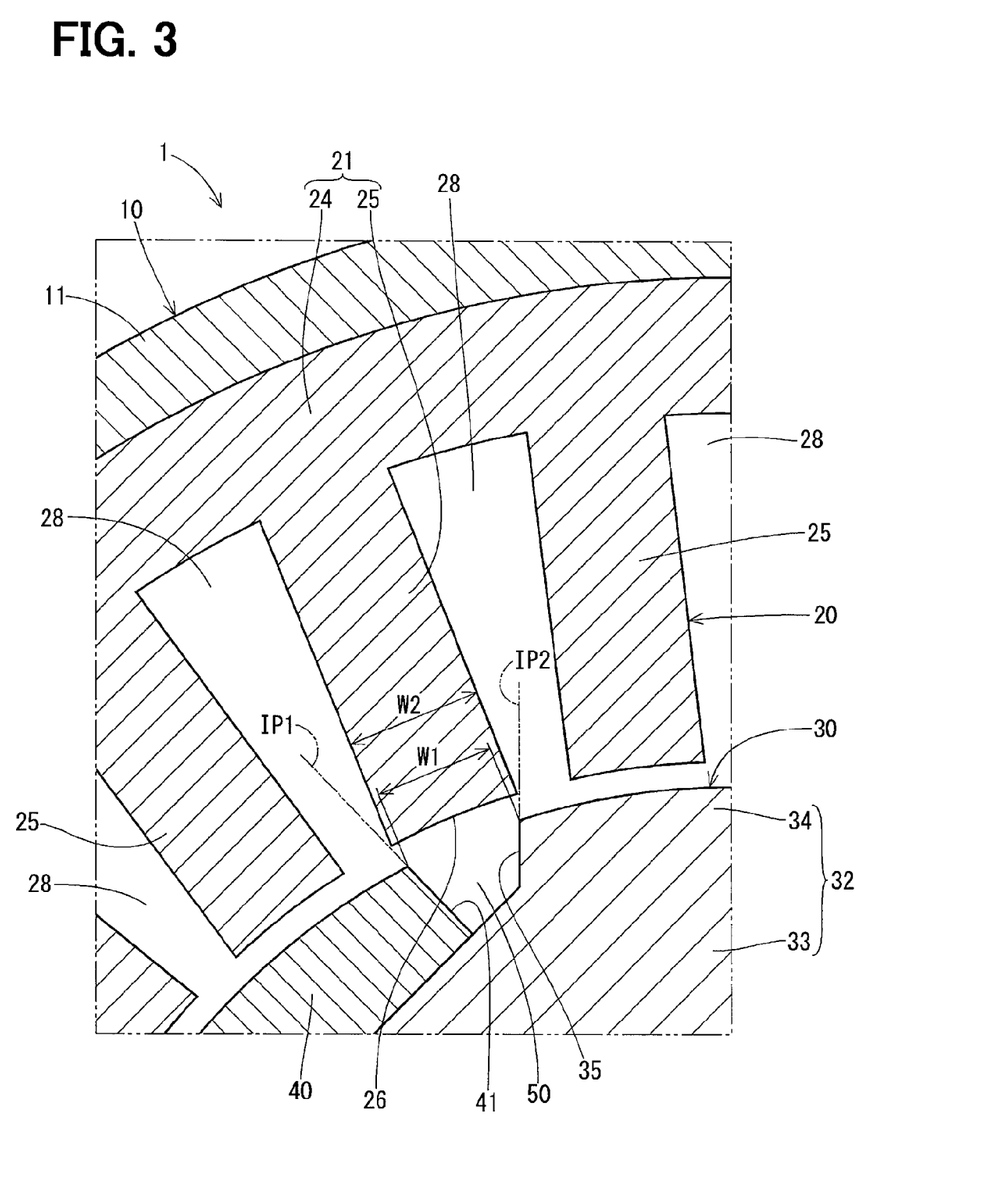
FIG. 3 is a diagram illustrating an enlarged view of a region III in FIG. 2.

Next, the stator 20 and the rotor 30 are described in detail with reference to FIGS. 2 and 3.

A width W1 of the gap 50 between the permanent magnet 40 and the projection 34 in the circumferential direction is smaller than a width W2 of an end of the tooth portion 25 in the circumferential direction. It is noted that the width W1 is an outermost width of the gap 50 in the radial outward direction and that the width W2 is an innermost width of the end of the tooth portion 25 in the radial inward direction. Here, an end surface of the permanent magnet 40 in the circumferential direction is defined as a first end surface 41, an end surface of the projection 34 in the circumferential direction is defined as a second end surface 35, an imaginary plane formed as an extension of the first end surface 41 is defined as a first imaginary plane IP1, and an imaginary plane formed as an extension of the second end surface 35 is defined as a second imaginary plane IP2. According to the first embodiment, when a center of the tooth portion 25 in the circumferential direction and a center of the gap 50 in the circumferential direction are aligned with each other in the radial direction (i.e., are on the same straight line in the radial direction), the tooth portion 25 is positioned within a region defined by the first imaginary plane IP1 and the second imaginary plane IP2.

Specifically, each permanent magnet 40 has two first end surfaces 41 opposite to each other in the circumferential direction. The two first end surfaces 41 of the permanent magnet 40 are parallel to each other. Likewise, each projection 34 has two second end surfaces 35 opposite to each other in the circumferential direction. The two second end surfaces 35 of the projection 34 are parallel to each other. A distance between the first end surface 41 and the second end surface 35, which face each other to form the gap 50, increases in the radial outward direction. Accordingly, a width of the region defined by the first imaginary plane IP1 and the second imaginary plane IP2 increases in the radial outward direction.

A width of the permanent magnet 40 in the circumferential direction is equal to a width of the projection 34 in the circumferential direction. When any one of the gaps 50 is positioned to face any one of the tooth portions 25 in the radial direction, each of the other gaps 50 is positioned to face any one of the other tooth portions 25 in the radial direction. When the number of the tooth portions 25 for every magnet pole and every phase is defined as "k", the number of the tooth portions 25 capable of facing each permanent magnet 40 in the radial direction is (3k−1), and also the number of the tooth portions 25 capable of facing each projection 34 in the radial direction is (3k−1). Since the number k is one, the number (3k−1) is two.

As described above, according to the first embodiment, the width W1 of the gap 50 between the permanent magnet 40 and the projection 34 in the circumferential direction is smaller than the width W2 of the end of the tooth portion 25 in the circumferential direction. Further, when the center of the tooth portion 25 in the circumferential direction and the center of the gap 50 in the circumferential direction are aligned with each other in the radial direction, the tooth portion 25 is positioned within the region defined by the first imaginary plane IP1 and the second imaginary plane IP2.

Figure 4:
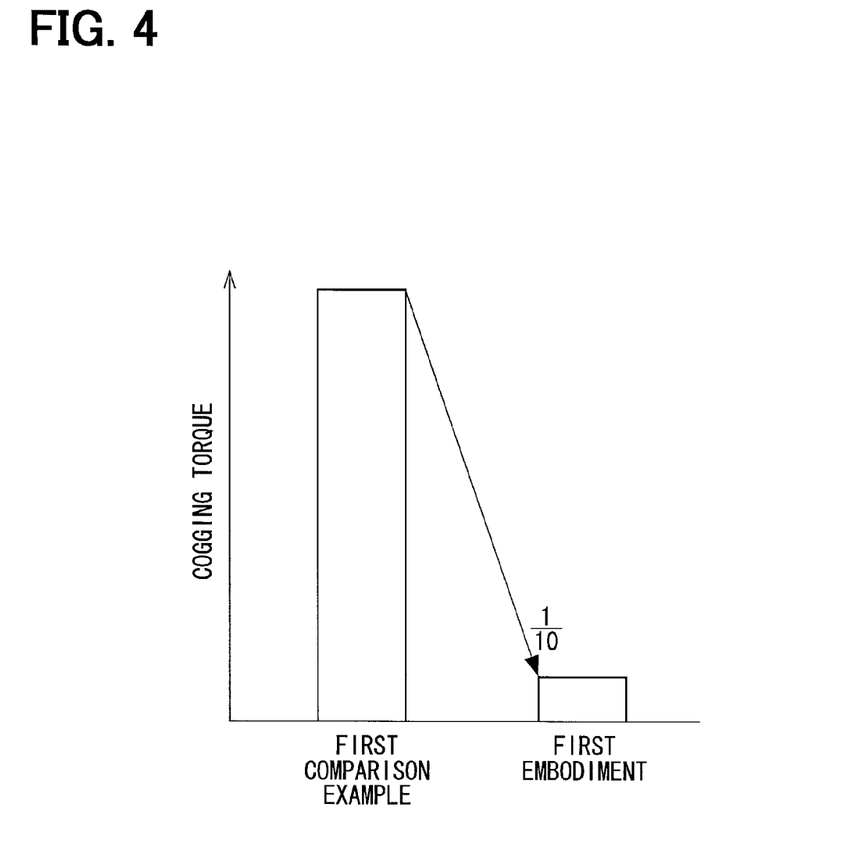
FIG. 4 is a diagram illustrating a comparison in cogging torque between the motor according to the first embodiment and a motor according to a first comparison example shown in FIG. 12.

In such an approach, the permanent magnets 40 and the projections 34 form a magnetic bypass having a suitable magnetic reluctance. Thus, since the main flux always flows so that a magnetic field variation can be reduced, cogging torque observed when no current is supplied to the winding set 22 is reduced. Further, since the leakage flux is reduced, output torque observed when a rated current is supplied to the winding set 22 is increased. As shown in FIG. 4, cogging torque in the first embodiment is about one-tenth of cogging torque in the first comparison example shown in FIG. 12.

Further, according to the first embodiment, the opposing first end surfaces 41 of the permanent magnet 40 are parallel to each other, and the opposing second end surfaces 35 of the projection 34 are parallel to each other.

Accordingly, the distance between the first end surface 41 and the second end surface 35, which face each other to form the gap 50, increases in the radial outward direction. Thus, the width W2 of the end of the tooth portion 25 in the circumferential direction can be increased as much as possible. Therefore, the magnetic flux flowing from the permanent magnet 40 to the stator core 21 can be easily collected by the tooth portion 25.

Further, according to the first embodiment, the width of the permanent magnet 40 in the circumferential direction is equal to the width of the projection 34 in the circumferential direction. Accordingly, each gap 50 has the same width in the circumferential direction, and the gaps 50 are arranged at regular intervals in the circumferential direction. Thus, when any one of the gaps 50 is positioned to face any one of the tooth portions 25 in the radial direction, each of the other gaps 50 can be positioned to face any one of the other tooth portions 25 in the radial direction. Therefore, synchronizing timing in the circumferential direction becomes equal so that the cogging torque can be reduced without a reduction in the output torque.

Further, according to the first embodiment, the number k, which is the number of the tooth portions 25 for every magnet pole and every phase, is one, and the number of the tooth portions 25 capable of facing each permanent magnet 40 in the radial direction is (3k−1), which is two. Thus, the output torque can be maximized while reducing the cogging torque as much as possible.

(Second Embodiment)

Figure 5:
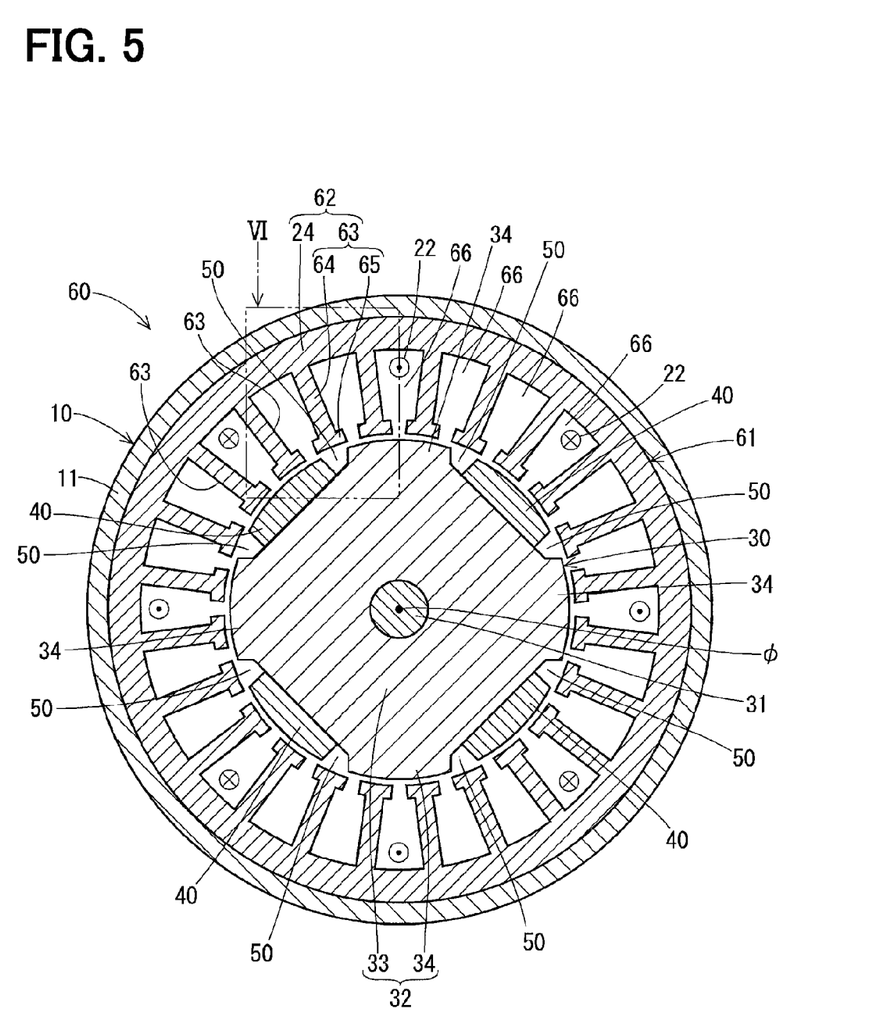
FIG. 5 is a diagram illustrating a cross-sectional view of an electrical motor according to a second embodiment of the present disclosure.
Figure 6:
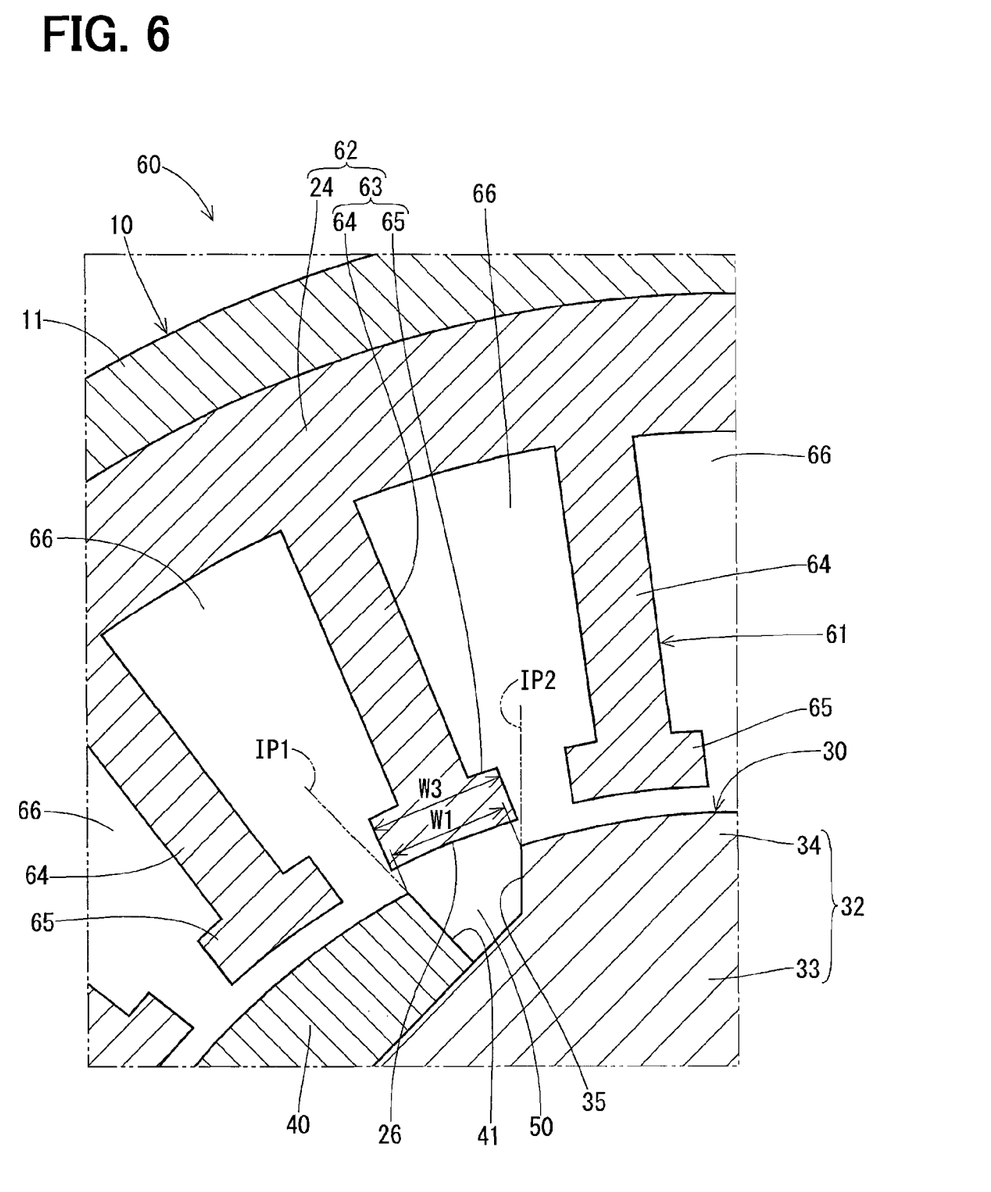
FIG. 6 is a diagram illustrating an enlarged view of a region VI in FIG. 5.

A motor 60 according to a second embodiment of the present disclosure is described below with reference to FIGS. 5 and 6. A difference of the second embodiment from the first embodiment is as follows.

A stator core 62 of a stator 61 of the motor 60 includes the yoke 24 and twenty-four tooth portions 63. Each tooth portion 63 has a leg 64 and a flange 65. The leg 64 extends from the yoke 24 in the radial inward direction. The flange 65 extends from an end of the leg 64 in both directions along the circumferential direction.

The width W1 of the gap 50 between the permanent magnet 40 and the projection 34 in the circumferential direction is smaller than a width W3 of the flange 65 in the circumferential direction. Further, when a center of the flange 65 in the circumferential direction and the center of the gap 50 in the circumferential direction are aligned with each other in the radial direction (i.e., are on the same straight line in the radial direction), the flange 65 is positioned within the region defined by the first imaginary plane IP1 and the second imaginary plane IP2.

Further, when any one of the gaps 50 is positioned to face any one of the tooth portions 63 in the radial direction, each of the other gaps 50 is positioned to face any one of the other tooth portions 63 in the radial direction. Further, when the number of the tooth portions 63 for every magnet pole and every phase is defined as "k", the number of the tooth portions 63 capable of facing each permanent magnet 40 in the radial direction is (3k−1), and also the number of the tooth portions 63 capable of facing each projection 34 in the radial direction is (3k−1). Since the number k is one, the number (3k−1) is two.

Figure 7:
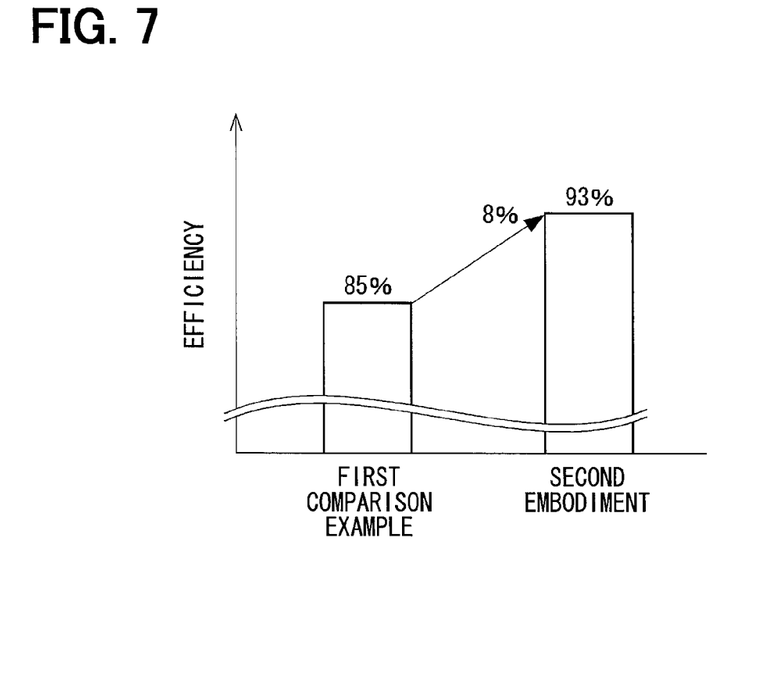
FIG. 7 is a diagram illustrating a comparison in efficiency between the motor according to the second embodiment and the motor according to the first comparison example.

The motor 60 of the second embodiment can have the same advantages as the motor 1 of the first embodiment. Further, since the slot 66 can be widened by narrowing the leg 64 of the tooth portion 63 up to the magnetic saturation limit, electrical loading can be increased. Thus, copper loss is reduced so that efficiency can be improved. For example, as shown in FIG. 7, the motor 60 is 8 percent more efficient than the first comparison example shown in FIG. 12. Accordingly, the size of the motor 60 can be reduced.

(Third Embodiment)

Figure 8:
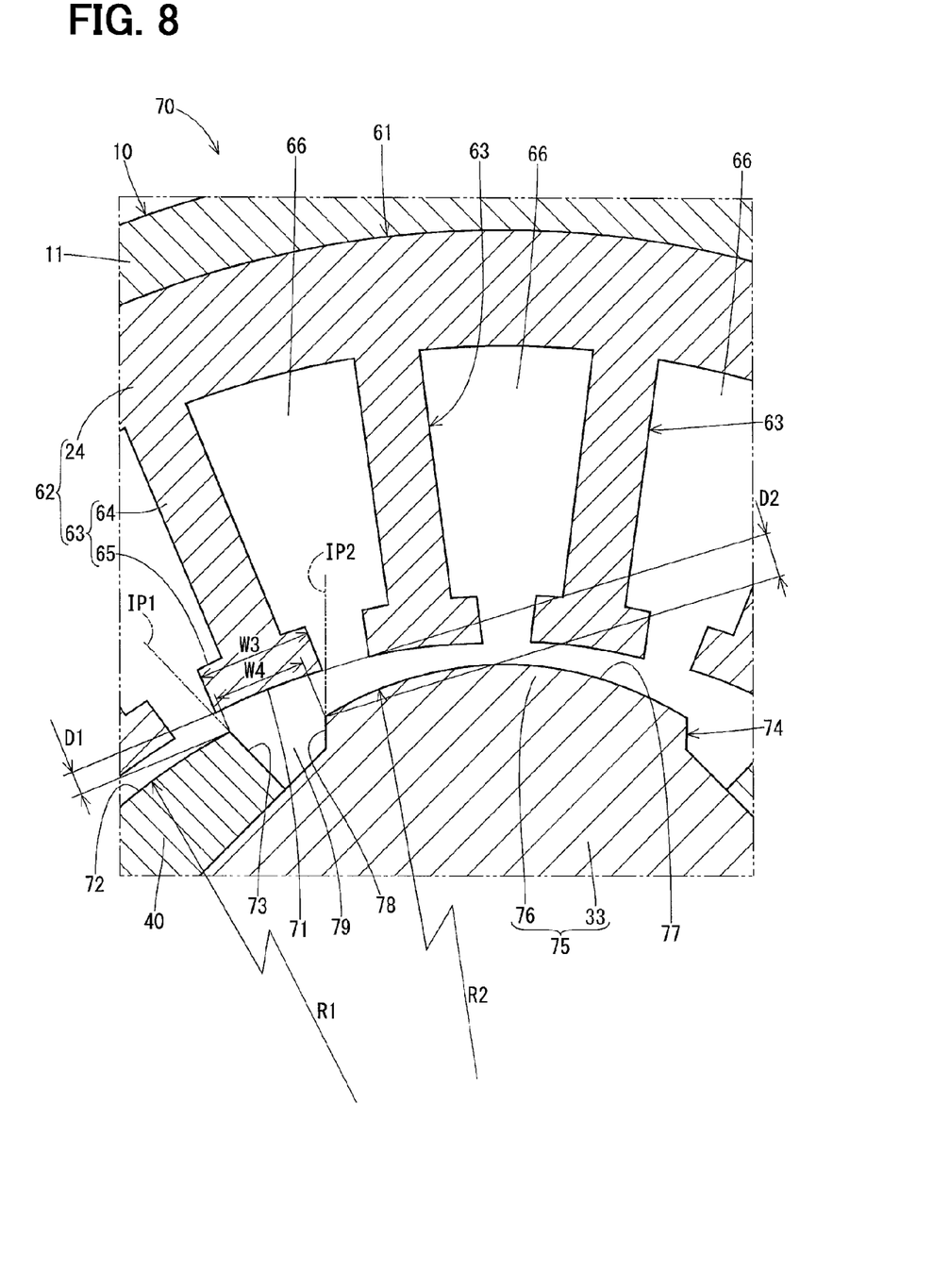
FIG. 8 is a diagram illustrating a partial enlarged cross-sectional view of an electrical motor according to a third embodiment of the present disclosure.

A motor 70 according to a third embodiment of the present disclosure is described below with reference to FIG. 8. A difference of the third embodiment from the preceding embodiments is as follows.

The motor 70 includes the stator 61 and a rotor 74. An end 71 of the tooth portion 63 of the stator core 62 in the radial inward direction is separated by a first distance D1 in the radial direction from an end 73 of an outer surface 72 of the permanent magnet 40 in the circumferential direction. The end 71 of the tooth portion 63 of the stator core 62 in the radial inward direction is separated by a second distance D2 in the radial direction from an end 78 of an outer surface 77 of a projection 76 of the rotor 74 in the circumferential direction. The first distance D1 is smaller than the second distance D2. Specifically, a distance between the end 71 of the tooth portion 63 and a center of the outer surface 72 of the permanent magnet 40 is equal to a distance between the end 71 of the tooth portion 63 and a center of the outer surface 77 of the projection 76. Further, a curvature radius R1 of the outer surface 72 of the permanent magnet 40 is larger than a curvature radius R2 of the outer surface 77 of the projection 76.

A width W4 of a gap 79 between the permanent magnet 40 and the projection 76 in the circumferential direction is smaller than the width W3 of the flange 65 in the circumferential direction. When any one of the gaps 79 is positioned to face any one of the tooth portions 63 in the radial direction, each of the other gaps 79 is positioned to face any one of the other tooth portions 63 in the radial direction. Further, when the number of the tooth portions 63 for every magnet pole and every phase is defined as "k", the number of the tooth portions 63 capable of facing each permanent magnet 40 in the radial direction is (3k−1), and also the number of the tooth portions 63 capable of facing each projection 76 in the radial direction is (3k−1). Since the number k is one, the number (3k−1) is two.

Figure 9:
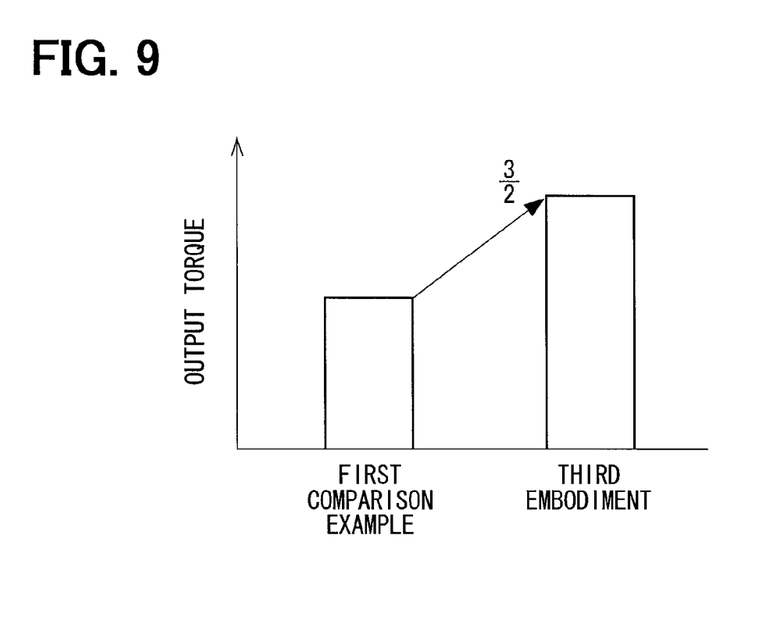
FIG. 9 is a diagram illustrating a comparison in output torque between the motor according to the third embodiment and the motor according to the first comparison example.

The motor 70 of the third embodiment can have the same advantages as the motor 1 of the first embodiment. Further, since the magnetic resistance can be increased by increasing the gap in the leakage flux path, the leakage flux can be effectively reduced. For example, as shown in FIG. 9, output torque of the motor 70 is 3/2 (i.e., 1.5) times greater than that of the first comparison example shown in FIG. 12. Accordingly, the size of the motor 60 can be reduced.

For example, like the first embodiment, the rotor core 75 can be made by stamping steel into a predetermined shaped plate and by laminating the steel plates. In such an approach, the curvature radius R2 of the outer surface 77 of the projection 76 can be easily made smaller than the curvature radius R1 of the outer surface 72 of the permanent magnet 40.

(Fourth Embodiment)

Figure 10:
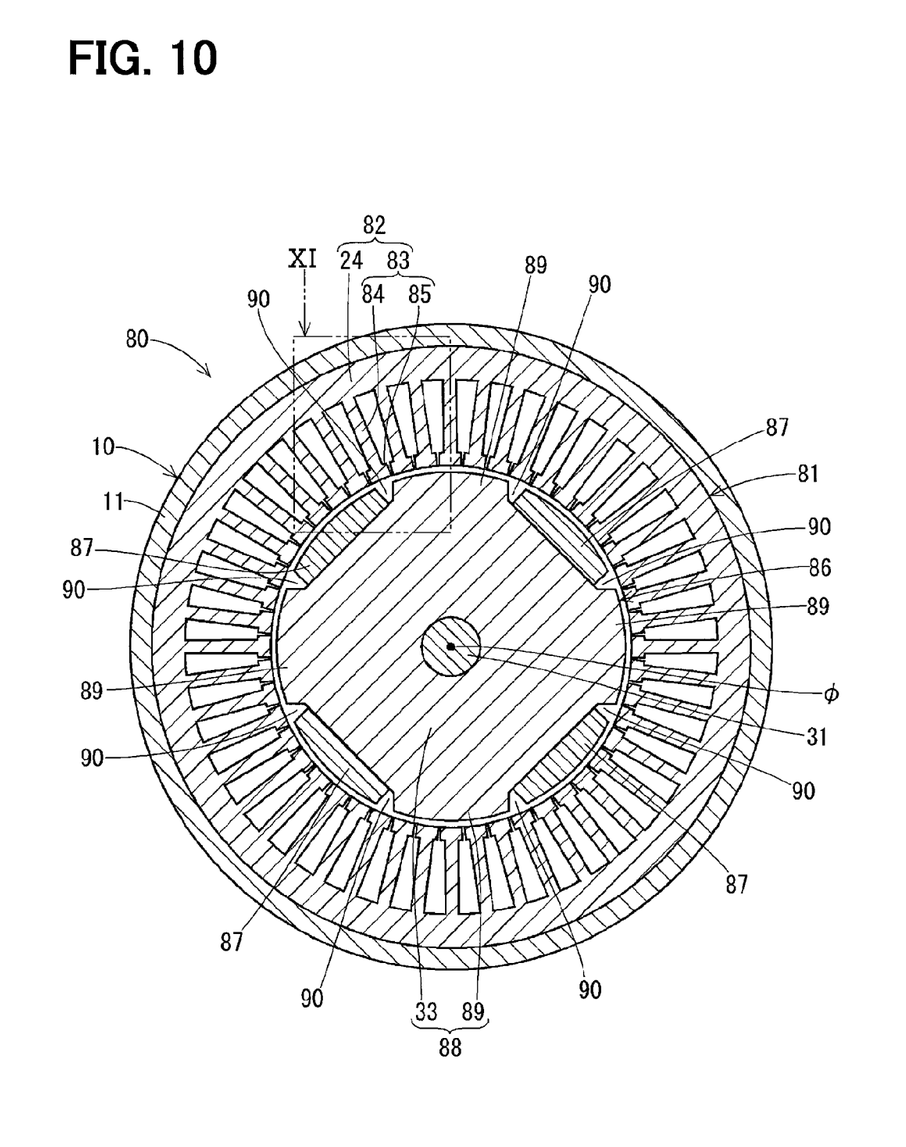
FIG. 10 is a diagram illustrating a cross-sectional view of an electrical motor according to a fourth embodiment of the present disclosure.
Figure 11:
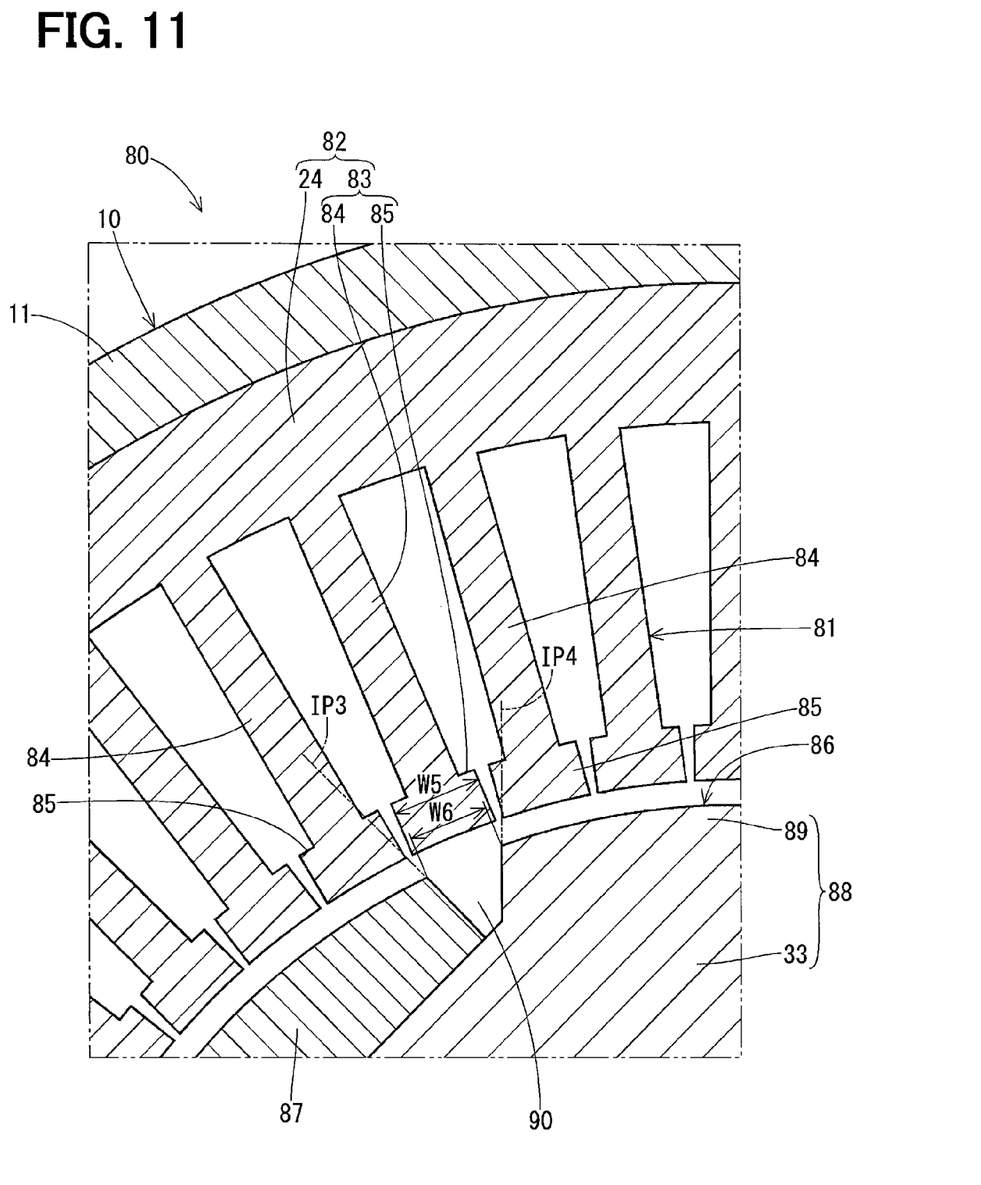
FIG. 11 is a diagram illustrating an enlarged view of a region XI in FIG. 10.

A motor 80 according to a fourth embodiment of the present disclosure is described below with reference to FIGS. 10 and 11. A difference of the fourth embodiment from the preceding embodiments is as follows.

The motor 80 includes a stator 81 and a rotor 86. A stator core 82 of the stator 81 includes the yoke 24 and tooth portions 83. Each tooth portion 83 has a leg 84 and a flange 85. The leg 84 extends from the yoke 24 in the radial inward direction. The flange 85 extends from an end of the leg 84 in both directions along the circumferential direction.

A width W6 of a gap 90 between a permanent magnet 87 and a projection 89 of the rotor 86 in the circumferential direction is smaller than a width W5 of the flange 85 in the circumferential direction. Further, when a center of the flange 85 in the circumferential direction and a center of the gap 90 in the circumferential direction are aligned with each other in the radial direction (i.e., are on the same straight line in the radial direction), the flange 85 is positioned within a region defined by a first imaginary plane IP3 and a second imaginary plane IP4. The first imaginary plane IP3 is a plane formed as an extension of an end surface of the permanent 87 in the circumferential direction. The second imaginary plane IP4 is a plane formed as an extension of an end surface of the projection 89 in the circumferential direction.

The stator core 82 has forty-eight tooth portions 83. Therefore, the number of the tooth portions 83 for every magnetic pole and every phase is two. The tooth portions 83 are arranged at regular intervals in the circumferential direction. When the number of the tooth portions 83 for every magnet pole and every phase is defined as "k", the number of the tooth portions 83 capable of facing each permanent magnet 87 in the radial direction is (3k−1), and also the number of the tooth portions 83 capable of facing each projection 89 of the rotor core 88 in the radial direction is (3k−1). Since the number k is two, the number (3k−1) is five. When any one of the gaps 90 is positioned to face any one of the tooth portions 83 in the radial direction, each of the other gaps 90 is positioned to face any one of the other tooth portions 83 in the radial direction.

The motor 80 of the fourth embodiment can have the same advantages as the motor 1 of the first embodiment. Further, since the width of the flange 85 of the tooth portion 83 in the circumferential direction can be reduced, the width of the gap 90 in the circumferential direction can be reduced accordingly. As the width of the gap 90 in the circumferential direction becomes smaller, the widths of the permanent magnet 87 and the projection 89 in the circumferential direction become larger. Thus, magnetic loading can be increased so that output torque of the motor 80 can be increased.

(Modifications)

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

The number of poles of the rotor is not limited to eight. The number of phases is not limited to eight. The number of tooth portions for every magnet pole and every phase can vary depending on the intended use.

The rotor is not limited to a surface permanent magnet type rotor. The rotor can be an embedded permanent magnet type rotor.

The rotor can have a consequent-pole type structure partially in the axis direction.

The width of the gap between the permanent magnet and the projection in the circumferential direction can be equal to the width of the end of the tooth portion in the circumferential direction.

In the embodiments, a full pitch, distributed winding is employed. Alternatively, a different winding design such as a short pitch, distributed winding can be employed.

In the embodiments, the rotor core is made by laminating steel plates. Alternatively, the rotor core can be made by a different method. For example, the rotor core can be made by compression molding of magnetic powders.

The rotating electrical machine to which the present disclosure is applied is not limited to a motor. For example, the rotating electrical machine can be an alternator. When the present disclosure is applied to an alternator, cogging torque can be reduced without a reduction in output electrical power.

What is claimed is:

1. A rotating electrical machine comprising:
   a supporting member;
   a stator core including a ring-shaped yoke fixed to the supporting member and tooth portions projecting from the yoke in a radial inward direction;
   a winding placed in each slot between the tooth portions;
   a rotation shaft rotatably supported by the supporting member in the radial inward direction of the stator core;
   a rotor core including a boss portion and projections, the boss portion fixed to the rotation shaft, the projections projecting from the boss portion in a radial outward direction and spaced from each other in a circumferential direction; and
   a permanent magnet located between the tooth portions and fixed to the boss portion in such a manner that a gap is formed between the permanent magnet and the tooth portions in the circumferential direction, wherein
   a width of the gap in the circumferential direction is equal to or smaller than a width of a radial inward end of the tooth portion in the circumferential direction,
   opposing end surfaces of the permanent magnet in the circumferential direction is each defined as a first end surface,
   the opposing first end surfaces of the permanent magnet are planes parallel to each other, and opposing end surfaces of the projection in the circumferential direction is each defined as a second end surface, the opposing second end surfaces of the projection are planes parallel to each other, a distance between the first end surface and the second end surface which define the same gap increases in the radial outward direction, an imaginary plane coinciding with the first end surface is defined as a first imaginary plane, an imaginary plane coinciding with the second end surface is defined as a second imaginary plane, and when a center of the tooth portion in the circumferential direction and a center of the gap in the circumferential direction are aligned with each other, the tooth portion is positioned within a region defined by the first imaginary plane and the second imaginary plane which define the same gap.

2. The rotating electrical machine according to claim 1, wherein each tooth portion includes a leg and a flange, the leg extends from the yoke in the radial inward direction, the flange extends from a radial inward end of the leg in both directions along the circumferential direction, and when a center of the flange in the circumferential direction and the center of the gap in the circumferential direction are aligned with each other the flange is positioned within the region defined by the first imaginary plane and the second imaginary plane.

3. The rotating electrical machine according to claim 1, wherein the end of the tooth portion is separated by a first distance in the radial direction from an end of an outer surface of the permanent magnet in the circumferential direction, the end of the tooth portion is separated by a second distance in the radial direction from an end of an outer surface of the projection the circumferential direction, and the first distance is equal to or smaller than the second distance.

4. The rotating electrical machine according to claim 3, wherein a curvature radius of the outer surface of the permanent magnet is equal to or larger than a curvature radius of the outer surface of the projection.

5. The rotating electrical machine according to claim 1, wherein the number of the tooth portions for every magnetic pole and every phase is two or more, and the tooth portions are arranged at regular intervals in the circumferential direction.

6. The rotating electrical machine according to claim 1, wherein a width of the permanent magnet in the circumferential direction is equal to a width of the projection in the circumferential direction.

7. The rotating electrical machine according to claim 6, wherein the number of the tooth portions for every magnet pole and every phase is defined as k, the number of the tooth portions capable of facing each permanent magnet in the radial direction is 3k-1, and the number of the tooth portions capable of facing each projection in the radial direction is 3k-1.

8. The rotating electrical machine according to claim 1, wherein when any one of the gaps is positioned to face any one of the tooth portions in the radial direction, each of the other gaps is positioned to face any one of the other tooth portions in the radial direction.

* * * * *